US006896118B2

(12) United States Patent
Jones et al.

(10) Patent No.: US 6,896,118 B2
(45) Date of Patent: May 24, 2005

(54) COIN REDEMPTION SYSTEM

(75) Inventors: William J. Jones, Barrington, IL (US); Douglas U. Mennie, Barrington, IL (US); Jeffrey G. Knoll, Carol Stream, IL (US)

(73) Assignee: Cummins-Allison Corp., Mt. Prospect, IL (US)

(*) Notice: Subject to any disclaimer, the term of this patent is extended or adjusted under 35 U.S.C. 154(b) by 95 days.

(21) Appl. No.: 10/339,149

(22) Filed: Jan. 9, 2003

(65) Prior Publication Data

US 2003/0127299 A1 Jul. 10, 2003

Related U.S. Application Data

(60) Provisional application No. 60/347,476, filed on Jan. 10, 2002, and provisional application No. 60/364,628, filed on Mar. 15, 2002.

(51) Int. Cl.[7] ................................................ G06F 17/60

(52) U.S. Cl. ........................................................ 194/217

(58) Field of Search ..................... 186/37, 35; 194/215, 194/216, 217; 235/379, 380, 378

(56) References Cited

U.S. PATENT DOCUMENTS

| | | | | |
|---|---|---|---|---|
| 5,620,079 A | * | 4/1997 | Molbak | 194/217 |
| 5,799,767 A | * | 9/1998 | Molbak | 194/217 |
| 6,116,402 A | * | 9/2000 | Beach et al. | 194/216 |
| 6,264,545 B1 | | 7/2001 | Magee et al. | 453/3 |
| 6,484,863 B1 | * | 11/2002 | Molbak | 194/216 |
| 6,736,251 B2 | * | 5/2004 | Molbak | 194/347 |

FOREIGN PATENT DOCUMENTS

WO WO 99/21141 A1 * 4/1999 ........... G07F/17/42

OTHER PUBLICATIONS

Complaint, Cummins–Allison Corp. v. Glory Ltd., Glory Shoji Co. Ltd., and Glory (U.S.A. Inc., Civil Action No. 02C–7008, United States District Court, Northern District of Illinois, Eastern Division.

Billcon Corporation, Brochure for CCS–60/CCS–80 Series Coin Counter–Sorter, 2 pages (Oct. 1999).

Billcon Corporation, Photos for CCS–60/80, 1 page (Japanese language) (Oct. 12, 2000).

De La Rue Cash Systems, Inc., Brochure for ACD Automatic Coin Dispenser, 2 pages (no date).

De La Rue Cash Systems, Brochure for MACH 12 Coin Sorter/Counter, 2 pages (1999).

De La Rue Cash Systems, Brochure for MACH 12HD Coin Sorter/Counter, 2 pages (no date).

Glory, Brochure for GSA–500 Sortmaster, 2 pages (no date).

Magner, Brochure for COINSTREAM™ CPS 502 Self–Service Coin Processing System, 2 pages (no date).

Magner, Brochure for MAG II 100 Series Coin Sorters, 2 pages (no date).

Magner, Brochure for MAG II Model 915 Coin Counter/Packager, 2 pages (no date).

Magner, Brochure for Pelican 305 Coin Sorter, 2 pages (no date).

Magner, Brochure for 900 Series Coin Counters and Packagers, 2 pages (no date).

* cited by examiner

*Primary Examiner*—Donald P. Walsh
*Assistant Examiner*—Mark Beauchaine
(74) *Attorney, Agent, or Firm*—Jenkens & Gilchrist

(57) ABSTRACT

According to one embodiment of the present invention, a coin redemption system, in which a user deposits a batch of mixed coins of a plurality of denominations, comprises a coin input area for receiving a batch of mixed coins from a user of the coin redemption system, a coin processing unit coupled to the coin input area for determining the aggregate value of the coins received from the user, a controller for assigning a transaction number corresponding to the batch of received coins, a first printer for printing a receipt indicative of the determined value and the assigned transaction number, an output device disposed in a redemption area for displaying the assigned transaction number and the determined value.

17 Claims, 5 Drawing Sheets

COIN REDEMPTION SYSTEM

CROSS-REFERENCE TO RELATED APPLICATIONS

The present invention claims priority to U.S. Provisional Patent Application Ser. Nos. 60/347,476 and 60/364,628, each of which is incorporated herein by reference in its entirety. U.S. Provisional Patent Application Ser. No. 60/347,476, titled "Coin Redemption System," was filed on Jan. 10, 2002. U.S. Provisional Patent Application Ser. No. 60/364,628, titled "Coin Redemption System," was filed on Mar. 15, 2002.

FIELD OF THE INVENTION

The present invention relates generally to currency processing machines, and, in particular, to a coin redemption system that processes coins of mixed denominations and outputs a receipt indicative of the value of the processed coins that is redeemable for currency bills.

BACKGROUND OF THE INVENTION

Coin processing machines generally have the ability to receive bulk coins from a user of the machine. Coin processing machines include a redemption type of machine wherein, after the deposited coins are counted, a receipt is issued indicating the value of the deposited coins. The user may redeem this receipt for the amount of deposited coins in the form of currency bills. In other embodiments, the receipt is redeemed for the amount of the deposited coins less a commission charged for use of the coin redemption machine.

Prior art coin redemption machines are commonly used in a banking environment and/or a retail environment such as a grocery store. In operation, a user inputs (i.e., deposits) a batch of coins of mixed denominations into a hopper of the coin redemption machine. The machine determines the value of the deposited coins and outputs a receipt indicative of the determined amount. In some embodiments, the receipt also indicates a second, lesser amount, which reflects a commission charged for use of the machine. The user redeems the receipt for paper currency for the value of the deposited coins less the commission. For example, in a banking environment, a user redeems the receipt at the teller's window. In a retail environment, the user can redeem the receipt at a cashier's station or a customer-service station.

One disadvantage associated with prior art coin redemption machines is the potential for fraud which exists with current receipt-type systems. For example, a receipt can be duplicated (i.e., counterfeited) and then redeemed more than once resulting in a loss for that particular store. Furthermore, if the receipt is lost by the user or is stolen from the user, the prior art machines fail to provide any manner for the user to recover their funds. Someone who has stolen or found the receipt can simply redeem the receipt from the retailer's cashier and receive the cash payment.

Accordingly, there exists a need for a coin redemption system that provides security measures to guard against the unauthorized reproduction of redeemable receipts issued by the coin redemption machine. Further, there exists a need for a coin redemption system that provides security measures to guard against the unauthorized redemption of otherwise valid receipts.

SUMMARY OF THE INVENTION

According to one embodiment of the present invention, a coin redemption system, in which a user deposits a batch of mixed coins of a plurality of denominations, comprises a coin input area for receiving a batch of mixed coins from a user of the coin redemption system, a coin processing unit coupled to the coin input area for determining the aggregate value of the coins received from the user, a controller for assigning a transaction number corresponding to the batch of received coins, a first printer for printing a receipt indicative of the determined value and the assigned transaction number, an output device disposed in a redemption area for displaying the assigned transaction number and the determined value.

The above summary of the present invention is not intended to represent each embodiment, or every aspect, of the present invention. Additional features and benefits of the present invention will become apparent from the detailed description, figures, and claims set forth below.

Figure 1:
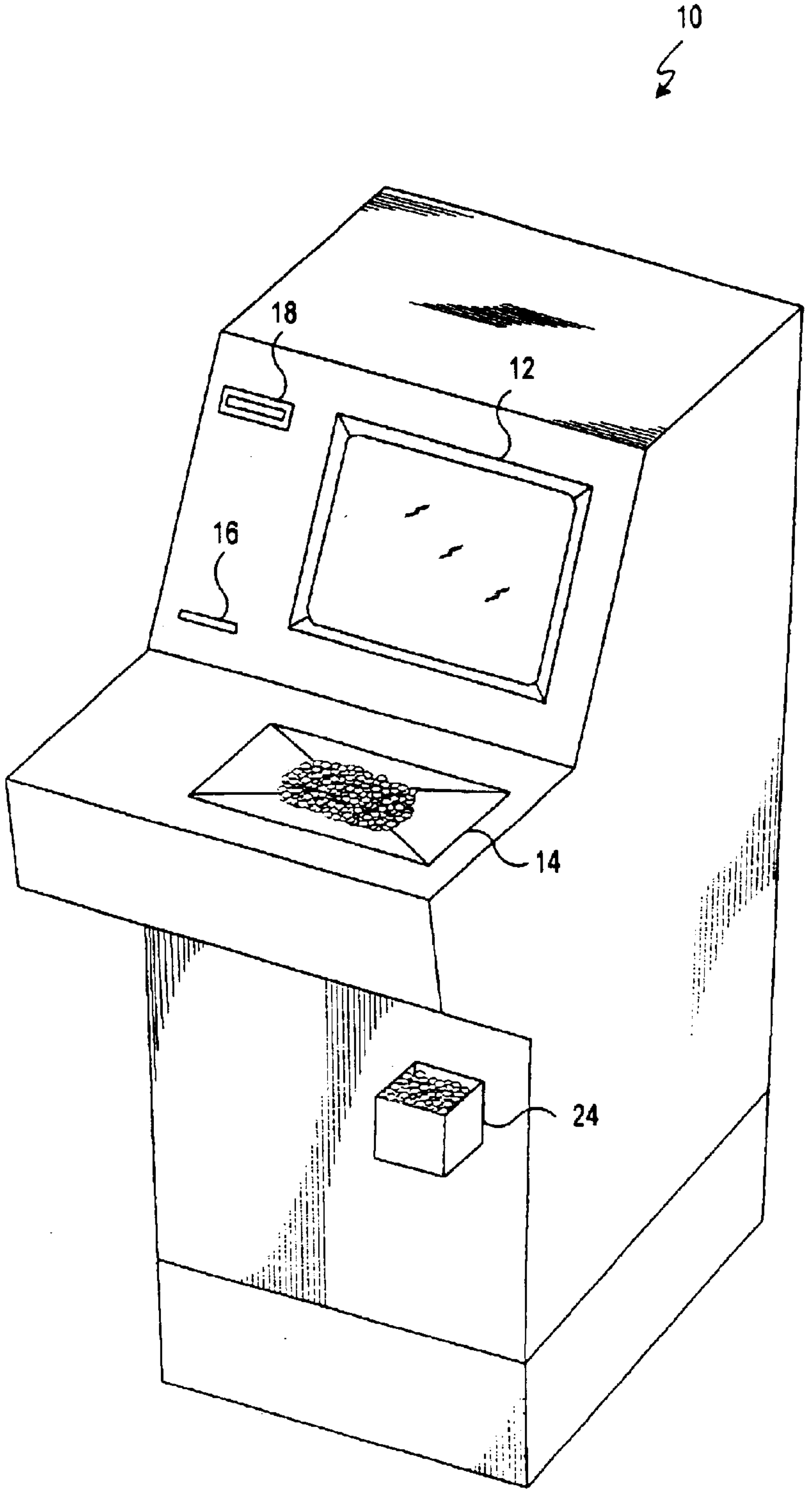
FIG. 1 is a perspective view of a coin redemption machine according to one embodiment of the present invention.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Referring to the drawings and, initially, to FIG. 1, a coin redemption machine 10 according to one embodiment of the present invention includes a touch screen 12 to provide inputs from a machine user and also to display outputs to be viewed by the user. While the touch screen 12 is the preferred mode to enter data from the user of the coin redemption machine 10, the coin redemption machine 10 may also include a mechanical keyboard or buttons to receive such inputs.

The coin redemption machine 10 includes a coin input area 14 which receives coins of mixed denominations from a user. The coin input area 14 allows the user of the currency processing machine 10 to deposit the user's coins which will ultimately be converted to some other sort of fund source (i.e., currency bills, credit to a smartcard, credit to an account, credit for purchases in the store containing the redemption machine 10, etc.) that is available to the user.

According to the embodiment of the coin redemption machine 10 illustrated in FIG. 1, the coin input area 14 is generally funnel-shaped to direct coins to a coin processing area within the machine 10. According to an alternative embodiment of the coin redemption machine 10, the coin input area 14 includes a coin tray that is pivotable from a first position, wherein the coin tray is substantially horizontal, to a second position, wherein the coin tray is lifted causing the coins to slide under the force of gravity into the coin redemption machine 10. A coin tray similar to that described which may be used in connection with the coin input area 14 of the coin redemption machine 10 is described in greater detail in U.S. Pat. No. 4,964,495 entitled "Pivoting Tray For A Coin Sorter," which issued on Oct. 23, 1990 and is incorporated herein by reference in its entirety.

The currency processing machine 10 further includes a paper dispensing slot 16 for providing a user with a receipt of the transaction that the user has performed. The receipt issued by the coin redemption machine 10 is described in greater detail below according to several alternative embodiments of the present invention.

In its simplest form, the coin redemption machine 10 receives coins via the coin input receptacle 14, and after these deposited coins have been authenticated and counted, the currency redemption machine 10 outputs a receipt to the user indicative of the dollar amount of the deposited coins. For example, the user of the currency processing machine 10 may input $20.50 in various coins and the coin redemption machine 10 prints a receipt indicating that $20.50 worth of coins have been processed. The user can redeem the receipt for funds from an attendant of the coin redemption machine 10. An attendant may include a store employee such as a cashier at a grocery store or a teller at a bank. Alternatively, the user can redeem the receipt for credit towards purchases at the store where the machine is located and/or in exchange for merchandise at the store. Alternatively still, the currency processing machine 10 credits a user's account such as a bank account or an account associated with a store credit card, a store "rewards" program card or a coupon-type card which a user produces at the time of purchase for discounts. Further, in other embodiments, a commission may be charged for use of the machine. Alternatively still, a bonus may be added onto the amount redeemed. For example, a store may desire to have a promotion to attract users into a store whereby an amount (e.g., a percentage of the coins processed) in addition to the dollar amount of coins processed which is credited towards purchases at the store. Additionally, in other alternative embodiments of the coin redemption machine 10, the receipt includes other information such as a transaction number and/or totals for each coin denomination.

The coin redemption machine 10 also includes a media slot 18 into which the user may insert an account card (e.g., a bank card such as an ATM card, an identification card including the type distributed by grocery stores, smartcards, etc.). The media slot is coupled to a media reader/writer device 34 (FIG. 2) in the coin redemption machine 10 that is capable of reading from or writing to one or more types of media including ATM cards, credit cards, smartcards or other types of media cards. This media may include various types of memory storage technology such as magnetic storage, solid state memory devices and optical devices. The touch screen 12 typically provides the user with a menu of options which prompts the user to carry out a series of actions for identifying the user by displaying certain commands and requesting that the user depress touch keys on the touch screen 12 (e.g., a user PIN, account number, etc.).

Figure 2:
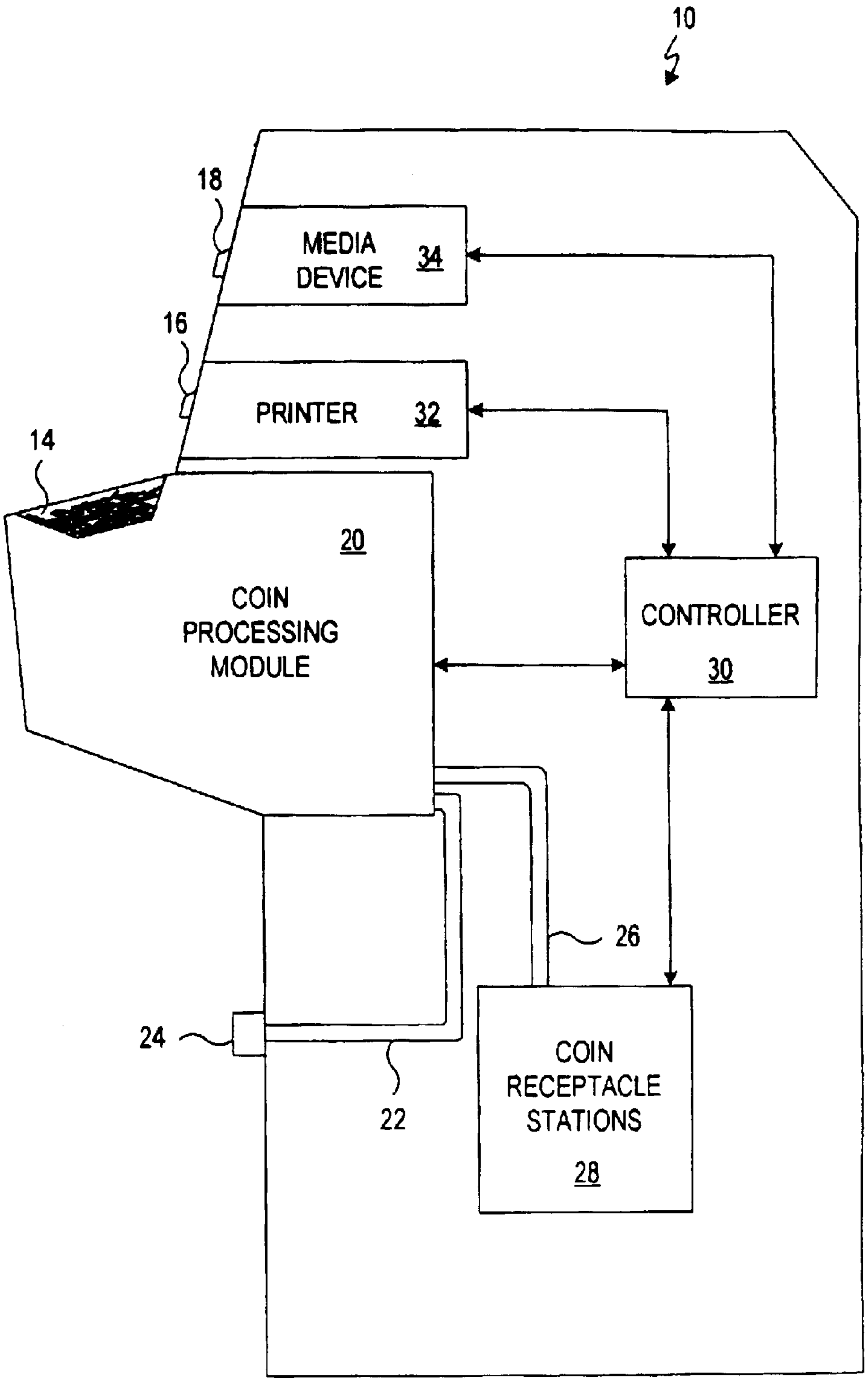
FIG. 2 is a side view of the coin redemption machine shown in FIG. 1 which schematically illustrates the components present in the coin redemption machine according to one embodiment of the present invention.

FIG. 2 illustrates a side view of the coin redemption machine 10. The coin redemption machine 10 includes a coin processing module 20. The coin processing module 20 counts and authenticates coins of mixed denominations that are deposited in the coin input receptacle 14, which leads directly into the coin processing module 20. The coins may also be sorted in the coin processing module 20 in a variety of ways such as by sorting based on the diameter of the coins. When a coin can not be authenticated by the coin processing module 20, that coin is directed through a coin reject tube 22 which leads to the rejected coin receptacle 24 which allows the user who has deposited such a non-authenticated coin to retrieve the coin by accessing the dispensed coin receptacle 24. Alternatively, non-authenticated coins may be routed to a reject coin bin (not shown) disposed within the coin redemption machine 10 and are not returned to the user. Disk-type coin sorters and authenticating devices which can perform the function of the coin processing module 20 of the coin redemption machine 10 are disclosed in U.S. Pat. Nos. 5,299,977, 5,453,047, 5,507,379, 5,542,880, 5,865,673 and 5,997,395, each of which is incorporated herein by reference in its entirety. Alternatively, other coin sorters such as rail sorters can be used to perform the function of the coin processing module 20. A rail sorter that can perform the function of the coin processing module 20 of the coin redemption machine 10 according to an alternative embodiment of the present invention is described in U.S. Pat. No. 5,382,191 entitled "Coin Queuing Device And Power Rail Sorter," which is incorporated herein by reference in its entirety.

The coin processing module 20 outputs the authenticated coins via one or more exit channels (not shown). According to one embodiment, each coin exit channel is coupled to a coin tube 26 which is coupled to a coin receptacle station 28. The coin tube 26 leads to coin receptacle station 28 for each of the coin denominations that are to be sorted and authenticated by the coin processing module 20. The coin receptacle station 28 includes coin bags or bins for holding each sorted coin denomination. Other coin distribution schemes are implemented in alternative embodiments of the present invention. Many alternative coin distribution schemes are described in greater detail in U.S. Pat. No. 6,318,537 B1 entitled "Currency Processing Machine With Multiple Internal Coin Receptacles," which is incorporated herein by reference in its entirety.

The currency processing machine 10 includes a controller 30 which is coupled to the coin processing module 20, a printer 32 for outputting a receipt via the paper dispensing slot 16, and a media reader/writer device 34 for receiving media via the media slot 18 within the currency processing machine 10 and controls the interaction among these units. For example, the controller 30 may review the input totals from the coin processing module 20 and direct the printer 32 to output a receipt indicative of the total amount or direct the media reader/writer device 34 to credit a smartcard for the values of the processed coins.

In an alternative embodiment of the coin redemption machine 10, the coin processing module 20 only counts the coins and does not store the coins in a sorted fashion. Or, the coin processing module 20 may tabulate the value of the coins that are processed without ever sorting them. In either of these situations, the coins are sent from the coin processing module 20 to a single coin receptacle station 28 that commingles the processing coins. Because the coins are not being sorted by denomination in this embodiment, the coin redemption machine 10 only requires one receptacle station 28 for collecting all of the mixed coins.

Figure 3:
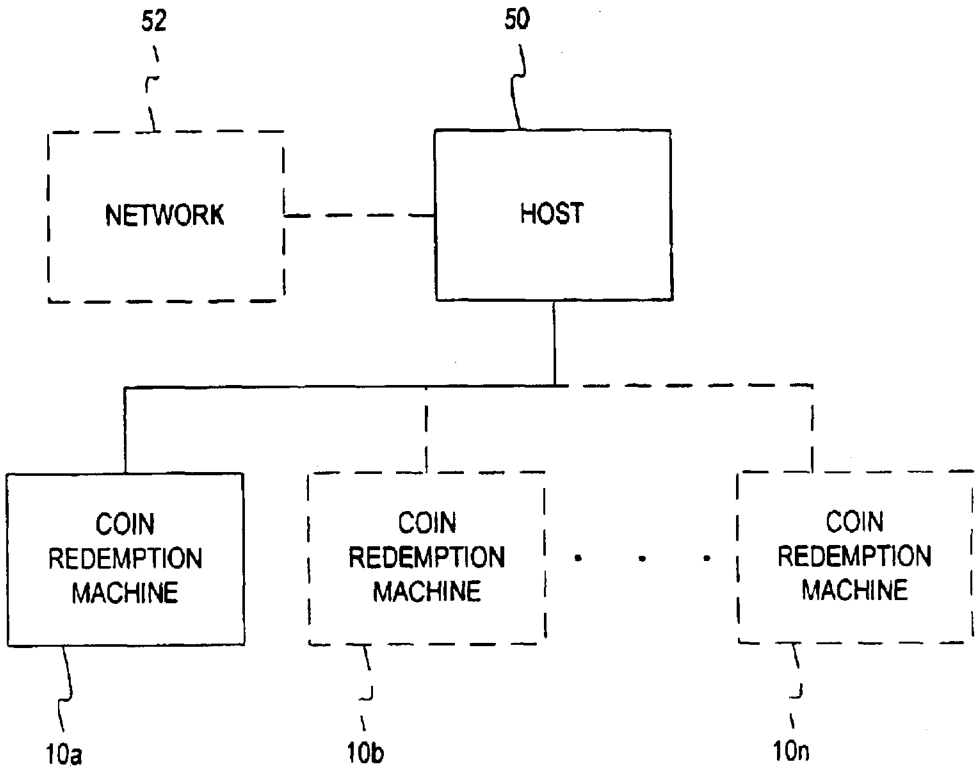
FIG. 3 schematically illustrates a plurality of coin redemption machines in communication with a network according to an alternative embodiment of the present invention.

Referring now to FIG. 3, a host system 50 is coupled to one or more coin redemption machines 10*a*, 10*b*, . . . 10*n*. The host system 50 communicates with each coin redemption machine 10 for tracking the various deposits input to the coin redemption machines 10 and the receipts printed, as will be described in greater detail below. Additionally, the coin redemption machines 10 send signals to the host system 50 when the coin receptacles of the coin receptacles station 28 are full or when a fault condition—a coin jam, coin bag is full, printer out of paper—is encountered. Moreover, the host system 50 may be connected to a network 52, such as an accounting system, which allows the user of the coin redemption machine 10 to credit the user's account after making a deposit. Alternatively, the coin redemption machine 10 outputs a receipt bearing an assigned transaction number and the host system 50 stores the transaction number and the corresponding amount. In a retail store setting where each cashier's station is coupled to the network 52, the cashier can verify the value of coins processed when presented with the receipt bearing the transaction number.

According to one alternative embodiment of the present invention, the receipt issued by the coin redemption machine 10 prints the store name (e.g., where the machine resides), the total amount of coins processed, and commission information charged by the store such as the percentage of commission being charged. For example, if a retail store charges a commission of 10%, the receipt may read "Subject to a Processing Fee of 10%—Remit to Any Cashier for Processing—Redeemable For Cash Only." When the cashier is presented with the receipt by the user, the cashier calculates the commission and then dispenses currency bills and coins to the user in an amount equal to the dollar value of the coins processes less the commission calculated by the cashier. According to some alternative embodiments, the cashier also provides the user with a second receipt, along with the funds, indicating the dollar amount of the processed coins, the dollar amount of the commission calculated by the cashier and the dollar amount of funds dispensed to the user. In a different system, the receipt may read "Redeemable For Cash Or Merchandise." Other information can also be printed on the receipt including a transaction number, date, time, other location identifying information, coin totals and amounts by denomination, and other messages. Other messages may include information directing a user to a redemption area such as "Only Redeemable at Service Desk" or "Redeemable at Cashier Stations Nos. 10–15."

According to another alternative embodiment, the coin redemption machine 10 includes a currency bill dispensing module for dispensing currency bills in the amount of the deposited coins, or in the amount of the deposited coins less a commission, to the user and not a receipt that is redeemable for cash by the user. The coin redemption machine 10 optionally includes a coin dispensing module for dispensing coins back to the user. Alternatively still, the coin redemption machine does not include a coin dispensing module and the amount due the user is rounded down to, or up to, the nearest whole dollar. A currency processing machine including a coin dispensing module and a currency bill dispensing module is described in U.S. Pat. No. 6,318,537 B1, incorporated herein by reference above. A coin redemption machine that outputs currency bills, and optionally coins, eliminates security concerns associated with the duplication of receipts because the coins are redeemed at the time of the transaction and any receipt issued is not redeemable for currency bills. Rather, any receipt serves solely as a record of the transaction.

According to another alternative embodiment of the coin redemption machine 10, each coin redemption operation is assigned a transaction number. The receipt issued by the coin redemption machine 10 has a transaction number printed thereon and, optionally, includes the value of the coin processed. Alternatively, the receipt includes additional information such as commission information or retail store information. In a simple form, such an embodiment includes a second, remote display located at the cashier's station or redemption area where the user redeems the receipts. The second display communicates to the cashier the transaction numbers and corresponding dollar amounts. When presented with a receipt for redemption, the cashier accesses the display to confirm that the dollar amount printed on the receipt favorably compares to the amount listed on the display. This embodiment guards against fraud by reducing the opportunity for tampering with the amount printed on the receipt. Alternatively, the dollar amount is displayed on the second display after the receipt bearer or cashier keys in the transaction number.

In more sophisticated embodiments, the controller 30 of the coin redemption machine 10 automatically eliminates transaction numbers from the second display after receipts are redeemed. For example, after a user presents a receipt to a cashier and that receipt bearing a particular transaction number is redeemed, the controller 30 deletes, "closes-out," or otherwise invalidates that particular transaction number thus preventing a receipt bearing that particular number from being redeemed again. Alternatively, the controller 30 causes the display to indicate that redeemed transaction numbers have in fact been redeemed and are no longer valid. Alternatively still, the receipt may include a barcode of the transaction number which is automatically read by a scanner at the cashier's station. Once the barcode is read, the dollar amount to be dispensed to the user is automatically displayed on a screen and the transaction number is automatically marked as redeemed on the display or, alternatively, is marked as so in a database where the transaction numbers and corresponding dollar amounts are stored. Accordingly, fraud by presenting duplicate receipts for redemption is guarded against.

Additionally, banks or stores may institute policies requiring that receipts may only be redeemed at the particular location where the coins are deposited. Put another way, receipts will only be honored at the store location where the receipt-issuing machine 10 is located. Thus, indicia of a particular store location is printed on the receipt. Such an embodiment discourages the duplicating of receipts and redeeming those receipts at other locations where the particular batch number may still be valid. Additionally or alternatively, a store may require that a receipt be redeemed within a predetermined amount of time (e.g., one or two hours). Alternatively still, the coin redemption machines 10 are networked together, as described above in connection with FIG. 3, for storing the transaction numbers in a common database to prevent transaction numbers from being redeemed at several locations. For example, a transaction number resulting from a transaction at a first store would be displayed on a second screen of the cashier's station in a second store. Alternatively still, the customer may key in the transaction number at a cash dispensing station which automatically (or manually via an attendant) output cash to the customer corresponding to the dollar amount. Each transaction number would only be capable of being redeemed one time.

In yet another alternative embodiment, a second printer is disposed at the cashier's station for printing a duplicate receipt which allows the cashier to compare the received receipt with the cashier's duplicate receipt for verifying that the information on both receipts favorably compares. Once the receipt is redeemed, the cashier can mark both receipts as redeemed, place both the receipts in a "redeemed area," or destroy the two receipts. Many types of fraud, including receipt counterfeiting, are prevented by only allowing redemption of receipts having a duplicate receipt printed at the cashier's station and by not allowing the redemption of receipts that have already been redeemed. Alternatively still, an additional display for displaying receipt numbers and amount may be placed at cashier's station, which would allow the cashier to ensure that the receipt number and amounts match what is shown on the receipt.

In still another alternative embodiment, the user inputs via the display 12 of the coin redemption machine 10 an account number wherein the value of the deposited coins, or the value of the deposited coins less a commission, is credited to the user's account. Types of accounts include bank accounts, credit card accounts, store credit card accounts, or other types of store accounts. Alternatively, a user inserts a media card into media slot 18 and coin redemption machine 10 reads the user's account number. The user may be required to input via the display 12 a personal identification number as an additional security measure. Alternatively still, the coin redemption machine 10 may credit the amount to a smartcard inserted into media slot 18. These embodiments frustrate fraudulent activities surrounding manipulating the receipt because any receipt issued serves solely as a record of the transaction and is not redeemable.

According to another alternative embodiment of the present invention, a user wanting to redeem coins for paper currency is first prompted by the display 12 of the coin redemption machine 10 for that user's security code. The security code can take on different forms according to various alternative embodiments of the present invention including the user's numerical birth date, social security number, or an identification number assigned by the particular retail or bank location. Alternatively, the coin redemption machine is tied to a network as illustrated in FIG. 3, and the user may input the user's store card, credit card, or ATM card as a security feature. After inputting the user's security code, the coin redemption machine 10 permits the user to deposit the user's coins. The coin redemption machine 10 processes the coins and determines the dollar amount of the deposited coins. This amount is communicated to the user via the display 12. If the amount is unacceptable to the user, the user indicates as such via the display and the machine 10 alerts an attendant (via a flashing light, audible signal, or electronically in an embodiment where the coin redemption machine 10 is linked to a host or network) to assist the user. Alternatively, the coin redemption machine 10 holds coins in an escrow area until the user indicates that the displayed amount is acceptable. If the user indicates that the amount is not acceptable, the coins are returned to the user from the escrow region. If the amount is acceptable to the user, the user indicates as such via the display 12 and a receipt is printed bearing a transaction number and optionally the dollar amount of the deposited coins. After the receipt is printed, the display 12 instructs the user to proceed to a particular cashier station, check-out lane, teller window or customer service area (collectively "redemption area") to redeem the receipt.

At the redemption area, the user is directed to a terminal where the user is prompted to enter the security code (or swipe the same card) that the user previously entered at the coin redemption machine 10 prior to depositing the coins. Next, the terminal prompts the user for the transaction number printed on the receipt. After the user has entered the correct security code and transaction number, the terminal displays the value of the deposited coins and displays authorization to a store employee to pay the user an amount equivalent to dollar amount of the deposited coins. Alternatively, if a commission is charged, the dollar amount of the deposited coins as well as that amount less a commission charged for use of the coin redemption machine 10 is displayed on the terminal.

According to yet another alternative embodiment of the present invention, one or more coin redemption machines are tied to a network, as illustrated in FIG. 3, which communicates with an automatic-teller-machine ("ATM") or a cash and coin dispensing station. The security code (or account number corresponding to a card inserted in the media slot 18), the transaction number and the determined dollar amount of the deposited coins are stored in a memory linked to the coin redemption machine 10 and the ATM. The user proceeds with the receipt bearing the transaction number to the ATM and inputs the user's a security code (or swipes a card) and the transaction number. The security code and transaction number input are compared to those stored in memory and are validated. Upon validation, the ATM then dispenses an appropriate amount of currency bills, and optionally coins, to the user.

This latter embodiment provides an additional level of protection to the user by storing the security numbers, transaction numbers, and determined totals in memory. If the user forgets the transaction number or misplaces the receipt, the user can request that an attendant access the system to look-up the transaction number(s) corresponding to the user's security code, which is stored in memory. In certain situations, the attendant may require a predetermined time period to pass between the initial contact by an alleged user and revealing the transaction number to the user. After waiting the predetermined time period, if no other claims are made on that transaction number, the attendant can pay the user, reveal the transaction number, or both.

Figure 4:
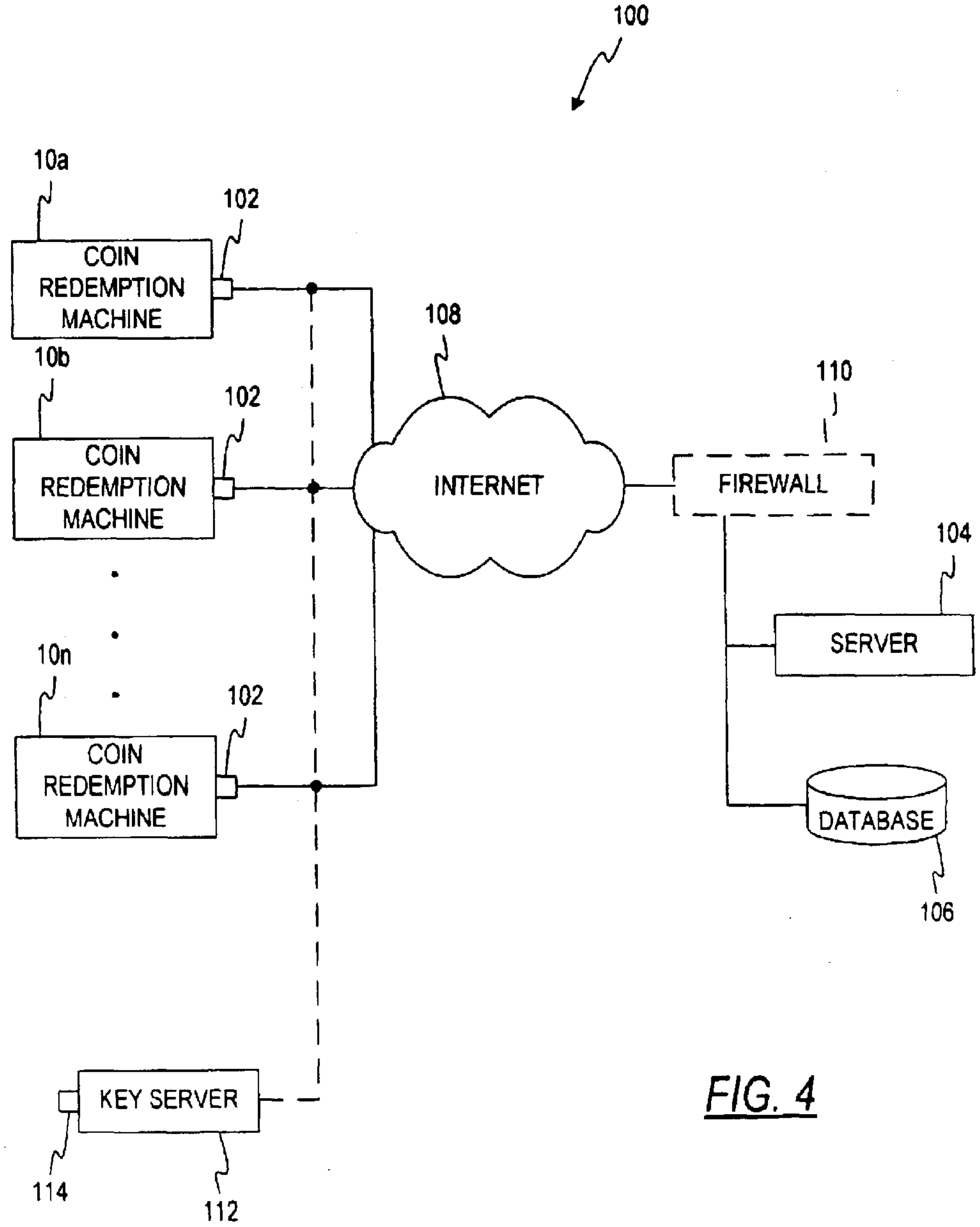
FIG. 4 is a block diagram illustrating component and connections in a redemption network according to an alternative embodiments of the present invention.

Referring now to FIG. 4, there is depicted a coin redemption network 100 according to an alternative embodiment of the present invention having a plurality of coin redemption machines 10*a*, 10*b*, . . . 10*n* communicatively linked thereto. Each coin redemption machine 10 has a connected communications device 102 such as, for example, a modem or ethernet card. In an alternative embodiment, the communication device 102 is a wireless device that enables wireless communication between a coin redemption machine 10 and to the coin redemption network 100.

According to one embodiment of the coin redemption network 100, the coin redemption machines 10 are equipped to communicate with one or more servers 104 and further to send information to or retrieve information from one or more databases 106. One method of enabling this communication is to connect the coin redemption machines 10, the one or more servers 104 and the one or more databases 106 via the Internet 108. The one or more servers 104 may be web servers, and further may be adapted to execute servlets, which may initiate and complete the tasks involved in running the coin redemption network 100. According to an alternative embodiment, each of the coin redemption machines may be linked directly (wired or wireless) to the server(s), and not to the Internet 108. Or, alternatively still, each of the coin redemption machines periodically "dial-in" directly to the server(s).

In order to maintain the integrity of information sent between the components of the coin redemption network 100, a number of security schemes may be employed. For example, a firewall 110 may be set up between the coin redemption machines 10 and the server and database components. Further, a key server 112 with a key server communications device 114 may be employed, as is known in the communications field.

Periodically, such as at predetermined times throughout the day or upon the occurrence of certain events such as at the conclusion of a coin redemption transaction, an update routine is performed wherein information is sent from the coin redemption machines 10 to the server 104. This information may include a transaction number and the corresponding dollar amount of received coins, a user's account information and the corresponding dollar amount of received coins and/or other information received from the user such as a security code and other information corresponding to the transaction. Further, in alternative embodiments of the coin redemption network, information regarding the status of the coin redemption machine 10 is sent to the server 104. Information regarding the status of the coin redemption machine 10 may include, or example, the number of coins (and corresponding dollar amount) in each of the coin receptacle stations 28 (FIG. 2), a signal indicating that a coin bag in a coin receptacle station 28 is full and service is required, a signal indicating that the printer 32 (FIG. 2) is low on paper or ink, or some other information indicative of a fault or error condition. Alternatively still, the operator interface 12 (FIG. 1) may include a button that a user depresses for summoning an attendant of the coin redemption machine 10. This request may be directed to the attendant via the coin redemption network 100.

An update routine may be carried out via calls automatically being made by a coin redemption machine 10 through the communications device 102 at predetermined times, on the occurrence of predetermined events or they may be manually initiated by an attendant of the machine 10 or a user of the machine 10 as indicated above An update routine may also be initiated by the server 104 or by users of the server 104.

Figure 5:
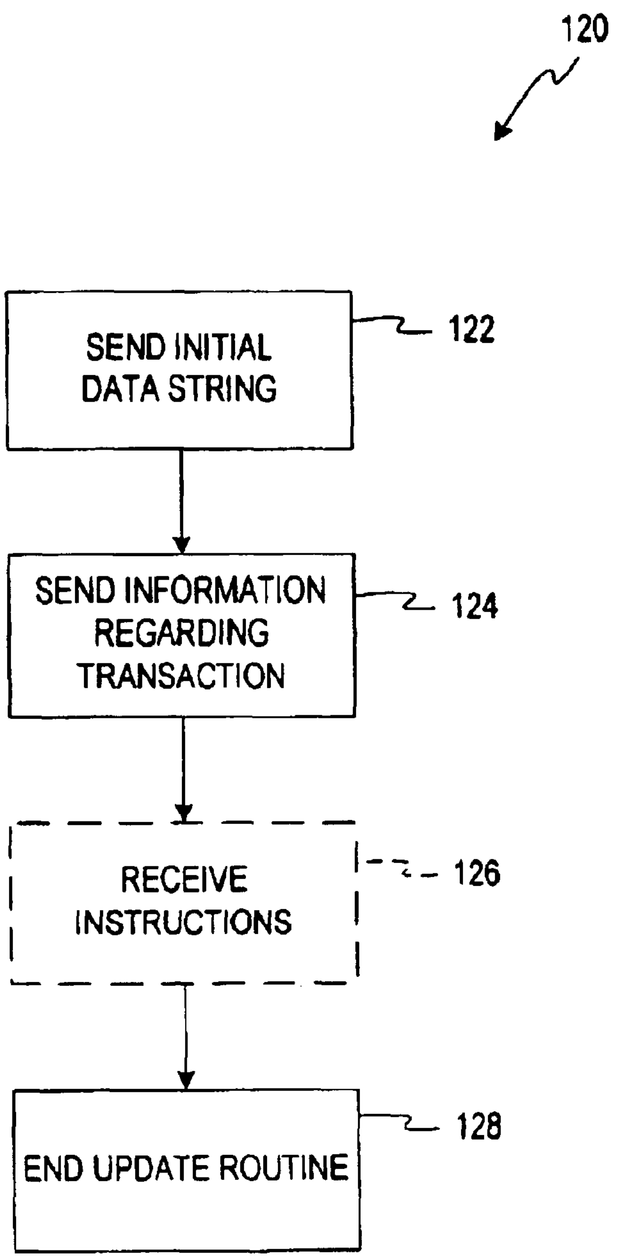
FIG. 5 is a block diagram of a coin redemption network update routine according to an alternative embodiment of the present invention.

One type of update routine 120 is shown in FIG. 5. According to one embodiment, the update routine 120 is initiated by the coin redemption machine 10 upon completion of a coin redemption process wherein the coin redemption machine 10 has output a receipt indicative of the dollar amount of coins received from the user ("the dollar amount") and a transaction number. According to one embodiment of the coin redemption network, the update routine begins with the sending of an initial data string from the coin redemption machine 10, as shown at step 122. The initial data string contains information initializing the communication, and may further contain information pertaining to the identity of the sending coin redemption machine 10 and protocol data units (PDUs) defining the type of information transmission. Further, the initial data string contains information identifying the transmission as an update routine.

Next, as shown at step 124, the information corresponding to the dollar amount for the transaction and the transaction number are sent from the redemption machine 10 to the server 104. In other embodiments, this information may include information corresponding to a plurality of transaction numbers and corresponding dollar amounts stored by the coin redemption machine 10 for a period of time such as several minutes. In other embodiments where the dollar amount is being credited to a smartcard, the machine 10 may only send information relating to the dollar amount credited to a smart card. In various other alternative embodiments, the machine 10 may also send information regarding user identification information (if input by a user of the machine).

Optionally, as shown in step 126, the coin redemption machine 10 receives instructions from the server 104. Such instructions may include instructions regarding a promotion wherein a bonus is added to the dollar amount of processed coins, regarding a change in commission to charge for use of the machine 10, or instructions regarding to what information to be printed in the receipt such as, for example, time, date, or other promotional information. The update routine is concluded at step 128.

According to one embodiment of the present invention, the plurality of coin redemption machines 10 are connected to a bank's network in a manner as shown in FIG. 3 or via the Internet as shown in FIG. 4 for crediting coins deposited in a redemption machine to a user's bank account. The user may be required to input identification information as described above. Crediting the coins directly to a bank account reduces the chances for fraud associated the redemption with counterfeit or duplicated receipts. The network 52 (FIG. 3) or server 104 (FIG. 4) is updated at predetermined times or on the occurrence of certain events to update the user's account with information regarding deposited coins. For example, according to one embodiment, the bank's network 52 (FIG. 3) or server 104 (FIG. 4) is updated upon completion of each transaction so that a user's account is credited with the deposited amount substantially immediately. This is in contrast with a traditional deposit-type ATM machine wherein deposits are not credited to a user's account until the deposited funds are retrieved by an operator and later verified back at a bank. In other embodiments, the bank's network 52 (FIG. 3) or server 104 (FIG. 4) is updated at predetermined time intervals, such as every hour, wherein the updates include information regarding all of the deposits over the previous hour. In such an embodiment, also, the users' accounts are updated very soon after the deposits are made.

In addition to embodiments described above and in the accompanying claims, several embodiments of the present inventions will now be described.

Alternative Embodiment A

A. A coin redemption system in which a user deposits a batch of mixed coins of a plurality of denominations, the system comprising:

a coin input area for receiving a batch of mixed coins from a user of the coin redemption system;

a coin processing unit coupled to the coin input area for determining the aggregate value of the coins received from the user;

a controller for assigning a transaction number corresponding to the batch of received coins;

a first printer for printing a receipt indicative of the determined value and the assigned transaction number; and an output device disposed in a redemption area for displaying the assigned transaction number and the determined value.

Alternative Embodiment B

B. The coin processing system of alternative embodiment A wherein the output device is a printer.

Alternative Embodiment C

C. The coin processing system of alternative embodiment A wherein the output device is a display.

Alternative Embodiment D

D. A method for redeeming coins for currency bills with a coin redemption system, the method comprising:

receiving a batch of mixed coins of a plurality of denominations in a coin receiving area of the coin redemption system;

determining the aggregate value of the received coins with a coin processing unit of the coin redemption system;

assigning a transaction number corresponding to the batch of received coins;

printing a first receipt indicative of the determined aggregate value and the assigned transaction number with a first printer of the coin redemption system;

displaying the determined aggregate value and the assigned transaction number separate from printing the first receipt;

comparing the printed receipt to the displayed determined aggregate value and assigned transaction number; and redeeming the receipt for currency bills and coins when the printed receipt favorably compares to the displayed determined aggregate value and assigned transaction number.

Alternative Embodiment E

E. The method of alternative embodiment D where redeeming further comprises redeeming the receipt for currency bills and coins in an amount equal to the determined aggregate value.

Alternative Embodiment F

F. The method of alternative embodiment D where redeeming further comprises redeeming the receipt for currency bills and coins in an amount equal to the determined aggregate value less a commission.

Alternative Embodiment G

G. The method of alternative embodiment D wherein displaying further comprises printing a second receipt indicative of the determined aggregate value and the assigned transaction number with a second printer at a second location where redemption is to occur.

Alternative Embodiment H

H. The method of alternative embodiment D wherein displaying further comprises displaying on a screen at a second location where redemption is to occur.

Alternative Embodiment I

I. A coin redemption system for receiving a batch of mixed coins of a plurality of denominations from a user and securely providing the user with a receipt that is redeemable for cash, the system comprising:

at least one coin redemption machine comprising, an first user interface for receiving a security code from a user of the coin redemption system, a coin input area for receiving the batch of mixed coins, a controller for assigning a transaction number corresponding to the batch of received coins, a coin processing unit coupled to the coin input area for determining the aggregate value of the received coins, and a printer for printing a receipt indicative of the determined aggregate value and the assigned transaction number; and at least one redemption station communicatively linked to the at least one coin redemption machine comprising, a second user interface adapted to receive input from the user including input indicative of the security code and the assigned transaction number, the second user interface being adapted to display the determined aggregate value upon receipt of the security code and the assigned transaction number, wherein the controller is adapted to verify that the received security code favorably compares to the received transaction number, and means for providing the user with currency bills and coins when the received security code favorably compares to the received transaction number.

Alternative Embodiment J

J. The coin redemption system of alternative embodiment I wherein the currency bills and coins are provided to the user in an amount equal to the determined aggregate value.

Alternative Embodiment K

K. The coin redemption system of alternative embodiment I wherein the currency bills and coins are provided to the user in an amount equal to the determined aggregate value less a commission.

Alternative Embodiment L

L. A method for securely redeeming coins for currency bills comprising:

receiving, on a first occasion, input from a user indicative of a security code;

receiving a batch of mixed coins of a plurality of denominations in a coin receiving area;

determining the aggregate value of the received batch of coins;

assigning a transaction number corresponding to the received batch of coins;

issuing a receipt indicative of the determined aggregate value and the assigned batch number, receiving, on a second occasion, input from the user indicative of the security code and the assigned transaction number;

comparing the input received on the first occasion with the input received on the second occasion; and dispensing currency bills and coins to the user when the input received on the first occasion favorably compares with the input received on the second occasion.

Alternative Embodiment M

M. The method of alternative embodiment L where dispensing further comprises dispensing currency bills and coins to the user in an amount equal to the determined aggregate value.

Alternative Embodiment N

N. The method of alternative embodiment L where dispensing further comprises dispensing currency bills and coins to the user in an amount equal to the determined aggregate value less a commission.

Alternative Embodiment O

O. A coin processing system for receiving a batch of mixed coins of a plurality of denominations from a user and securely providing the user with a receipt that is redeemable for cash, the system comprising:

at least one coin redemption machine comprising a media reader adapted to read information from a media card of a user of the coin processing system, a coin input area for receiving a batch of coins from the user, a controller for assigning a transaction number corresponding to the received batch of coins, a coin processing unit coupled to the coin input area for determining the aggregate value of the received coins, and a printer for printing a receipt indicative of the determined aggregate value and the assigned transaction number; and at least one redemption station communicatively linked to the at least one coin redemption machine comprising a user terminal including a media reader adapted to read information from the media card of the user and a user interface being adapted to receive input from the user indicative of the assigned transaction number, the user terminal being adapted to display the determined aggregate value upon reading the media card and receipt of the assigned transaction number, wherein the controller is adapted to verify that information read from the media card favorably compares to the received transaction number, means for providing the user with currency bills and coins when the information read from the media card favorably compares to the received transaction number.

Alternative Embodiment P

P. The coin processing system of alternative embodiment O wherein the currency bills and coins are provided to the user in an amount equal to the determined aggregate value.

Alternative Embodiment Q

Q. The coin processing system of alternative embodiment O wherein the currency bills and coins are provided to the user in an amount equal to the determined aggregate value less a commission.

Alternative Embodiment R

R. A method for redeeming coins for currency bills with a coin processing system including a coin redemption machine and a redemption area, the method comprising:

receiving a batch of coins of mixed denominations in a coin receiving area of the coin redemption machine;

determining the aggregate value of the received coins with a coin processing unit of the coin redemption machine;

printing a receipt indicative of the determined aggregate with a printer of the coin redemption machine;

presenting an operator of the redemption area with the receipt;

calculating a commission after presenting the operator of the redemption are with the receipt;

providing the user with currency bills in an amount equivalent the determined aggregate value less the calculated commission.

Alternative Embodiment S

S. The method of alternative embodiment R further comprising displaying to the user the percentage of commission to be charged.

Alternative Embodiment T

T. The method of alternative embodiment R further comprising displaying to the user a chart summarizing the commission to be charged, the chart including at least one amount and a corresponding commission.

Alternative Embodiment U

U. A coin redemption system comprising:

one or more coin redemption machines located at one or more locations; each coin redemption machine being adapted to count a batch of mixed coins received from a user and to determine a total amount corresponding to the value of the received coins;

a database for storing information; and at least one server adapted to electronically communicate with each coin redemption machine, the at least one server being adapted to receive information indicative of the determined total amounts from each coin redemption machine and to store that information in the database.

Alternative Embodiment V

V. The system of alternative embodiment U further comprising an operator interface for receiving information from an operator of a coin redemption machine indicative of an account of the user.

Alternative Embodiment W

W. The system of alternative embodiment U wherein the at least one server is associated with a bank.

Alternative Embodiment X

X. The system of alternative embodiment U wherein the at least one server receives information indicative of the determined total amount substantially immediately after the total amount corresponding to the value of the received coins is determined by the coin redemption machine.

Alternative Embodiment Y

Y. The system of alternative embodiment X wherein the information is stored in the database substantially immediately after information indicative of the determined total is received by the server.

Alternative Embodiment Z

Z. The system of alternative embodiment U wherein each of the one or more coin redemption machines is adapted for electronic communication over the Internet, and wherein the one or more servers are web servers adapted for electronic communication over the Internet and are adapted to located and communicated with each of the one or more coin redemption machines over the Internet.

While the present invention has been described with reference to one or more particular embodiments, those skilled in the art will recognize that many changes may be made thereto without departing from the spirit and scope of the present invention. Each of these embodiments and obvious variations thereof is contemplated as falling within the scope of the claimed invention, which is set forth in the following claims.

What is claimed is:

1. A coin redemption system in which a user deposits a batch of mixed coins of a plurality of denominations, the system comprising:

a coin input area for receiving a batch of mixed coins from a user of the coin redemption system;

a coin processing unit coupled to the coin input area for determining the aggregate value of the coins received from the user;

a controller for assigning a transaction number corresponding to the batch of received coins;

a first printer for printing a receipt indicative of the determined value and the assigned transaction number; and an output device disposed in a redemption area for displaying the assigned transaction number and the determined value.

2. The coin processing system of claim 1 wherein the output device is a printer.

3. The coin processing system of claim 1 wherein the output device is a display.

4. A method for redeeming coins for currency bills with a coin redemption system, the method comprising:

receiving a batch of mixed coins of a plurality of denominations in a coin receiving area of the coin redemption system;

determining the aggregate value of the received coins with a coin processing unit of the coin redemption system;

assigning a transaction number corresponding to the batch of received coins;

printing a first receipt indicative of the determined aggregate value and the assigned transaction number with a first printer of the coin redemption system;

displaying the determined aggregate value and the assigned transaction number separate from printing the first receipt;

comparing the printed receipt to the displayed determined aggregate value and assigned transaction number; and redeeming the receipt for currency bills and coins when the printed receipt favorably compares to the displayed determined aggregate value and assigned transaction number.

5. The method of claim 4 where redeeming further comprises redeeming the receipt for currency bills and coins in an amount equal to the determined aggregate value.

6. The method of claim 4 where redeeming further comprises redeeming the receipt for currency bills and coins in an amount equal to the determined aggregate value less a commission.

7. The method of claim 4 wherein displaying further comprises printing a second receipt indicative of the determined aggregate value and the assigned transaction number with a second printer at a second location where redemption is to occur.

8. The method of claim 4 wherein displaying further comprises displaying on a screen at a second location where redemption is to occur.

9. A coin redemption system for receiving a batch of mixed coins of a plurality of denominations from a user and securely providing the user with a receipt that is redeemable for cash, the system comprising:

at least one coin redemption machine comprising, a first user interface for receiving a security code from a user of the coin redemption system, a coin input area for receiving the batch of mixed coins, a controller for assigning a transaction number corresponding to the batch of received coins, a coin processing unit coupled to the coin input area for determining the aggregate value of the received coins, and a printer for printing a receipt indicative of the determined aggregate value and the assigned transaction number; and at least one redemption station communicatively linked to the at least one coin redemption machine comprising, a second user interface adapted to receive input from the user including input indicative of the security code and the assigned transaction number, the second user interface being adapted to display the determined aggregate value upon receipt of the security code and the assigned transaction number, wherein the controller is adapted to verify that the received security code favorably compares to the received transaction number, and means for providing the user with currency bills and coins when the received security code favorably compares to the received transaction number.

10. The coin redemption system of claim 9 wherein the currency bills and coins are provided to the user in an amount equal to the determined aggregate value.

11. The coin redemption system of claim 9 wherein the currency bills and coins are provided to the user in an amount equal to the determined aggregate value less a commission.

12. A method for securely redeeming coins for currency bills comprising:

receiving, on a first occasion, input from a user indicative of a security code;

receiving a batch of mixed coins of a plurality of denomination in a coin receiving area;

determining the aggregate value of the received batch of coins;

assigning a transaction number corresponding to the received batch of coins;

issuing a receipt indicative of the determined aggregate value and the assigned batch number;

receiving, on a second occasion, input from the user indicative of the security code and the assigned transaction number;

comparing the input received on the first occasion with the input received on the second occasion;

dispensing currency bills and coins to the user when the input received on the first occasion favorably compares with the input received on the second occasion.

13. The method of claim 12 where dispensing further comprises dispensing currency bills and coins to the user in an amount equal to the determined aggregate value.

14. The method of claim 12 where dispensing further comprises dispensing currency bills and coins to the user in an amount equal to the determined aggregate value less a commission.

15. A coin processing system for receiving a batch of mixed coins of a plurality of denominations from a user and securely providing the user with a receipt that is redeemable for cash, the system comprising:

at least one coin redemption machine comprising a media reader adapted to read information from a media card of a user of the coin processing system, a coin input area for receiving a batch of coins from the user, a controller for assigning a transaction number corresponding to the received batch of coins, a coin processing unit coupled to the coin input area for determining the aggregate value of the received coins, and a printer for printing a receipt indicative of the determined aggregate value and the assigned transaction number; and at least one redemption station communicatively linked to the at least one coin redemption machine comprising a user terminal including a media reader adapted to read information from the media card of the user and a user interface being adapted to receive input from the user indicative of the assigned transaction number, the user terminal being adapted to display the determined aggregate value upon reading the media card and receipt of the assigned transaction number, wherein the controller is adapted to verify that information read from the media card favorably compares to the received transaction number, means for providing the user with currency bills and coins when the information read from the media card favorably compares to the received transaction number.

16. The coin processing system of claim 15 wherein the currency bills and coins are provided to the user in an amount equal to the determined aggregate value.

17. The coin processing system of claim 15 wherein the currency bills and coins are provided to the user in an amount equal to the determined aggregate value less a commission.

* * * * *